(12) United States Patent
Richardson et al.

(10) Patent No.: US 8,150,868 B2
(45) Date of Patent: Apr. 3, 2012

(54) USING JOINT COMMUNICATION AND SEARCH DATA

(75) Inventors: Matthew R. Richardson, Redmond, WA (US); Parag Singla, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 11/761,047

(22) Filed: Jun. 11, 2007

(65) Prior Publication Data

US 2008/0306935 A1    Dec. 11, 2008

(51) Int. Cl.
G06F 7/04      (2006.01)
G06F 17/40     (2006.01)

(52) U.S. Cl. ........ 707/767; 707/748; 707/749; 707/751; 707/723

(58) Field of Classification Search .................. 707/3, 4, 707/5, 999.003, 999.004, 999.005, 723, 748, 707/749, 751, 767, 7, 104.1, 999.007, 999.107
See application file for complete search history.

(56) References Cited

U.S. PATENT DOCUMENTS

| | | | |
|---|---|---|---|
| 5,996,006 A | 11/1999 | Speicher | |
| 6,064,978 A | 5/2000 | Gardner et al. | |
| 6,513,013 B1 | 1/2003 | Stephanou | |
| 6,598,046 B1 | 7/2003 | Goldberg et al. | |
| 6,654,725 B1 | 11/2003 | Langheinrich et al. | |
| 6,728,752 B1 | 4/2004 | Chen et al. | |
| 6,829,585 B1 | 12/2004 | Grewal et al. | |
| 6,901,394 B2 | 5/2005 | Chauhan et al. | |
| 7,013,478 B1 | 3/2006 | Hendricks et al. | |
| 7,062,510 B1 | 6/2006 | Eldering | |
| 7,072,888 B1 | 7/2006 | Perkins | |
| 7,143,091 B2 | 11/2006 | Charnock et al. | |
| 7,319,992 B2 | 1/2008 | Gaos | |
| 7,392,185 B2 | 6/2008 | Bennett | |
| 7,409,384 B2 | 8/2008 | Szeto et al. | |
| 7,596,578 B1 | 9/2009 | Marks | |
| 7,653,627 B2 * | 1/2010 | Li et al. ................. | 707/999.007 |
| 7,668,748 B1 | 2/2010 | Veach | |
| 2001/0032244 A1 | 10/2001 | Neustel | |
| 2002/0052925 A1 | 5/2002 | Kim et al. | |
| 2002/0055880 A1 | 5/2002 | Unold et al. | |

(Continued)

FOREIGN PATENT DOCUMENTS

GB    189818056 A    5/1899

(Continued)

OTHER PUBLICATIONS

Chellapilla, et al., Improving Cloaking Detection Using Search Query Popularity and Monetizability, http://research.microsoft.com/~kumarc/pubs/chellapilla_airweb2006.pdf, Aug. 10, 2006, 7 pages, AIRWeb'06,Seattle, Washington, USA.

(Continued)

*Primary Examiner* — James Trujillo
*Assistant Examiner* — Bruce Moser
(74) *Attorney, Agent, or Firm* — Lee & Hayes, PLLC

(57) ABSTRACT

Conventionally, there are communities of individuals who perform Internet searches and communities of individuals who utilized Internet communications. While there is commonly a large amount of overlap between the two communities, there is little interaction between the two communities. Internet searches can be used to recommend interesting people to a user. Furthermore, Internet communications can be used to recommend content that is likely to be of interest to the user. In addition, previously engaged communications or searches can be used to disambiguate terms in a subsequent search.

18 Claims, 12 Drawing Sheets

U.S. PATENT DOCUMENTS

| | | |
|---|---|---|
| 2002/0081020 A1 | 6/2002 | Shimazu |
| 2003/0093276 A1 | 5/2003 | Miller et al. |
| 2003/0101104 A1 | 5/2003 | Dimitrova et al. |
| 2004/0044542 A1 | 3/2004 | Beniaminy et al. |
| 2004/0059708 A1 | 3/2004 | Dean et al. |
| 2004/0066531 A1 | 4/2004 | Kim |
| 2004/0133468 A1 | 7/2004 | Varghese |
| 2005/0027696 A1 | 2/2005 | Swaminathan et al. |
| 2005/0028200 A1 | 2/2005 | Sardera |
| 2005/0050097 A1 | 3/2005 | Yeh et al. |
| 2005/0075886 A1 | 4/2005 | LeFebvre et al. |
| 2005/0091106 A1 | 4/2005 | Reller et al. |
| 2005/0192822 A1 | 9/2005 | Hartenstein et al. |
| 2005/0222989 A1 | 10/2005 | Haveliwala et al. |
| 2005/0246736 A1 | 11/2005 | Beyda et al. |
| 2006/0004711 A1* | 1/2006 | Naam .............................. 707/3 |
| 2006/0041830 A1 | 2/2006 | Bohn |
| 2006/0047615 A1 | 3/2006 | Ravin et al. |
| 2006/0129536 A1 | 6/2006 | Foulger et al. |
| 2006/0218153 A1 | 9/2006 | Voon et al. |
| 2006/0242574 A1 | 10/2006 | Richardson et al. |
| 2007/0011155 A1* | 1/2007 | Sarkar .............................. 707/5 |
| 2007/0174265 A1 | 7/2007 | Gorti et al. |
| 2007/0179945 A1* | 8/2007 | Marston et al. ................... 707/5 |
| 2007/0219794 A1 | 9/2007 | Park et al. |
| 2007/0233658 A1* | 10/2007 | Coughlin et al. ................. 707/3 |
| 2008/0104004 A1 | 5/2008 | Brave et al. |
| 2008/0114737 A1* | 5/2008 | Neely et al. ....................... 707/3 |
| 2008/0162454 A1* | 7/2008 | Lundell et al. .................... 707/5 |
| 2008/0235189 A1 | 9/2008 | Rayman et al. |
| 2008/0294584 A1 | 11/2008 | Herz |

FOREIGN PATENT DOCUMENTS

| | | |
|---|---|---|
| JP | 2001022788 | 1/2001 |
| JP | 2001282092 | 10/2001 |
| WO | 02101483A3 A3 | 12/2002 |
| WO | WO 2008150672 A1 * | 12/2008 |

OTHER PUBLICATIONS

Goodman, et al., Implicit Queries for Email, http://www.cs.cmu.edu/~vitor/papers/ceas05.pdf, 9 pages.

Weikum, et al., Towards Self-Organizing Query Routing and Processing for Peer-to-Peer Web Search http://delis.upb.de/specials/paris05/paper/eccs05_weikum.pdf, 19 pages.

Noda, et al., Benchmark Study of Desktop Search Tools, http://www.uwebc.org/opinionpapers/archives/docs/desktop_search_04282005.pdf, Apr. 20, 2005, 15 pages, UW E-Business Consortium, University of Wisconsin-Madison.

Translated the Japanese Office Action mailed Sep. 16, 2011 for Japanese patent application No. 2008-508880, a counterpart foreign application of US patent No. 7,734,631, 5 pages.

Busnel, et al., "PROXSEM: Interest-based Proximity Measure to Improve Search Efficiency inP2P Systems," Proceedings of the Fourth European Conference on Universal Multiservice Networks (ECUMN'07), 2007, accessible at <<http://www.irisa.fr/asap/intraneUproxsem-interest-based-proximity-measure-to-improve-search-efficiency-in-p2p-systems.pdf/attachment_download/file>>, 10 pages.

ChaCha.com home page, accessible at <<http://www.chacha.com>>, accessed on Sep. 15, 2008, 2 pages.

Cowie, et al., "Automatic Question Answering," Proceedings of RIAO '2000, accessible at <<http://iliLumbc.edu/SergeiPub/AutomaticQA2000.pdf>>, 2000, 10 pages.

Freyne, et al., "Collecting Community Wisdom: Integrating Social Search & Social Navigation," Proceedings of the 12th international conference on Intelligent user interfaces, 2007, available at <<http://citeseerx.ist.psu.edu/viewdoc/download;jsessionid=F396AC79ACDC4D313A0365DBA81A8469?doi=1 0.1.1.89.1438&rep=rep1&type=pdf>>, 10 pages.

Freyne, et al., "Toward the Exploitation of Social Access Patterns for Recommendation," Proceedings of the 2007 ACM Conference on Recommender Systems, accessible at <<http://www.csLucd.ie/UserFiles/publications/1182162672681.pdf>>, 2007, 4 pages.

Godoy, et al., "An Agent-Based Recommender System to Support Collaborative Web Search Based on Shared User Interests," J.M. Haake, S.F. Ochoa, and A. Cechich (Eds.), CRIWG 2007, LNCS 4715, Springer-Verlag Berlin Heidelberg, 2007, pp. 303-318.

Kwok, et al., "Scaling Question Answering to the Web," accessible at <<http://www.cs.washington.edu/homes/weld/papers/mulder-www10.pdf>>, Nov. 13, 2000, pp. 1-22.

Leidner, et al., "Evaluating Question Answering Systems Using FAQ Answer Injection," Proceedings of the 6th Annual CLUK Research Colloquium, accessible at <<http://www.cs.jhu.edu/-ccb/publications/evaluating-question-answering-systems-using-faq-answer-injection.pdf>>, 2003, 6 pages.

Maybury, et al., "Virtually Integrated Visionary Intelligence Demonstration (VIVID)," accessible at <<https:llanalysis.mitre.org/proceedings/FinaLPapers_Files/271_C amera_Ready_Paper.pdf>>, 2005, 6 pages.

Morris, Meredith Ringel, "Interfaces for Collaborative Exploratory Web Search: Motivations and Directions for Multi-User Designs," CHI 2007 Workshop on Exploratory Search and HCI, 2007, 2007, accessible at <<http://research.microsoft.com/en-us/um/people/merrie/papers/merrie_exploratory_search wkshop_camera ready.pdf>>, 4 pages.

Morris, et al., "S3: Storable, Shareable Search," Interact 2007, 2007 accessible at <<http://research.microsoft.com/en-us/um/people/horvitzls3.pdf>>, 4 pages.

Morris, et al., "SearchTogether: An Interface for Collaborative Web Search," Proceedings of the 20th Annual ACM Symposium on User interface Software and Technology, 2007, accessible at <<http://research.microsoft.com/en-us/um/people/merrie/papers/searchtogether.pdf>>, 10 pages.

The Mexican Office Action mailed Apr. 1, 2011 for Mexican patent application No. MX/a/2007/013091, a counterpart foreign application of US patent No. 7,734,631.

Office Action for U.S. Appl. No. 12/211,113, mailed on May 16, 2011, Matthew Richardson, "Balanced Routing of Questions to Experts".

Rayan, et al., "Personalized Content Search and Retrieval in an Interest Group Environment," 2007, accessible at <<http://www.hipc.org/hipc2007/posters/content-search.pdf>>, 4 pages.

Vijayakumar, et al., "Digital Reference Service: Libraries Online 24/7," accessible at <<http://eprints.rclis.org/archivel00005667/01/vijayakumarjk_16.pdf>>, Proceedings of SIS-2005, Visakhapatanam, 2005, 5 pages.

Zhang, et al., "Building Interest-Oriented Web Search Union," Seventh International Conference on Parallel and Distributed Computing, Applications and Technologies, 2006, Dec. 2006, pp. 327-332.

* cited by examiner

USING JOINT COMMUNICATION AND SEARCH DATA

TECHNICAL FIELD

The subject specification relates generally to computerized information gathering and in particular to interconnecting search engines and messenger communications.

BACKGROUND

Traditional communication relies upon a physical communication structure. Two common structures are a postal service with sending and receiving points and a telephone system with an integrated network of wires. Furthermore, traditional information gathering engages a user to apply a direct focus to a single or small group of resources (e.g., encyclopedia set, a public library) in which to gather information. However, technological developments in computer application fields allow these traditional tasks to take place with greater efficiency.

One technological development is an ability to decipher large amounts of information. Conventionally, a user connects to an Internet search engine through a personal electronic device (e.g., computer, cellular telephone, personal digital assistant, etc.) The user enters a search query term or terms into a dialog box of a user interface. The search engine provides results listed in order of a likely probability of being relevant to the query term. One conventional method of operation is displaying results in an order based on amount of times the search term appears in the result.

Another technological development is electronic communication. Electronic communication takes many forms, including instant messenger applications, electronic mail (e-mail), and text messenger applications. In an instant messenger application, two individuals can communicate with one another through a real-time communication session by sending text messages throughout the session. The instant messenger application can include other features, such as an ability to correspond with video communication.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

There are communities of individuals that utilize search engines and communities of individuals that utilize messaging systems. There is typically a large amount of overlap between these two communities; individuals that are members of one community are commonly also members of the other community. However, there is little interaction between the two services (e.g., search engines and messaging systems). The subject specification suggests to a user content based on previous communications and/or parties to interact with based on previously performed searches; thus, the two services become interconnected.

A receiving component obtains information relating to searches performed by a user and communications the user engages in with another user. If the user performed a previous search, then a find component locates other users with an interest in the search performed by the user. A suggestion component then produces a recommendation of an individual with whom the user should communicate. The suggestion component can take into account auxiliary factors such as if any of the located individuals are on a contact list of an individual on the user's contact list. A saved copy is made of the recommendation and the recommendation is transmitted to the user.

If the user engaged in a previous interpersonal communication, then a find component locates content related to the interpersonal communication. A suggestion component selects content to recommend to the user based on the interpersonal communication. Selection by the suggestion component can derive from a plurality of sources, including topics of conversation engaged in by other individuals engaged in by the interpersonal communication and/or topics searched by other individuals engaged in by the interpersonal communication.

The subject specification can also assist in disambiguating Internet queries. Often times, an operator of an electronic device enters in search terms that carry ambiguity. The ambiguity commonly arises from multiple meanings for a word. Previous communications and/or previous queries can be used to determine a likely meaning of a word used in a query.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
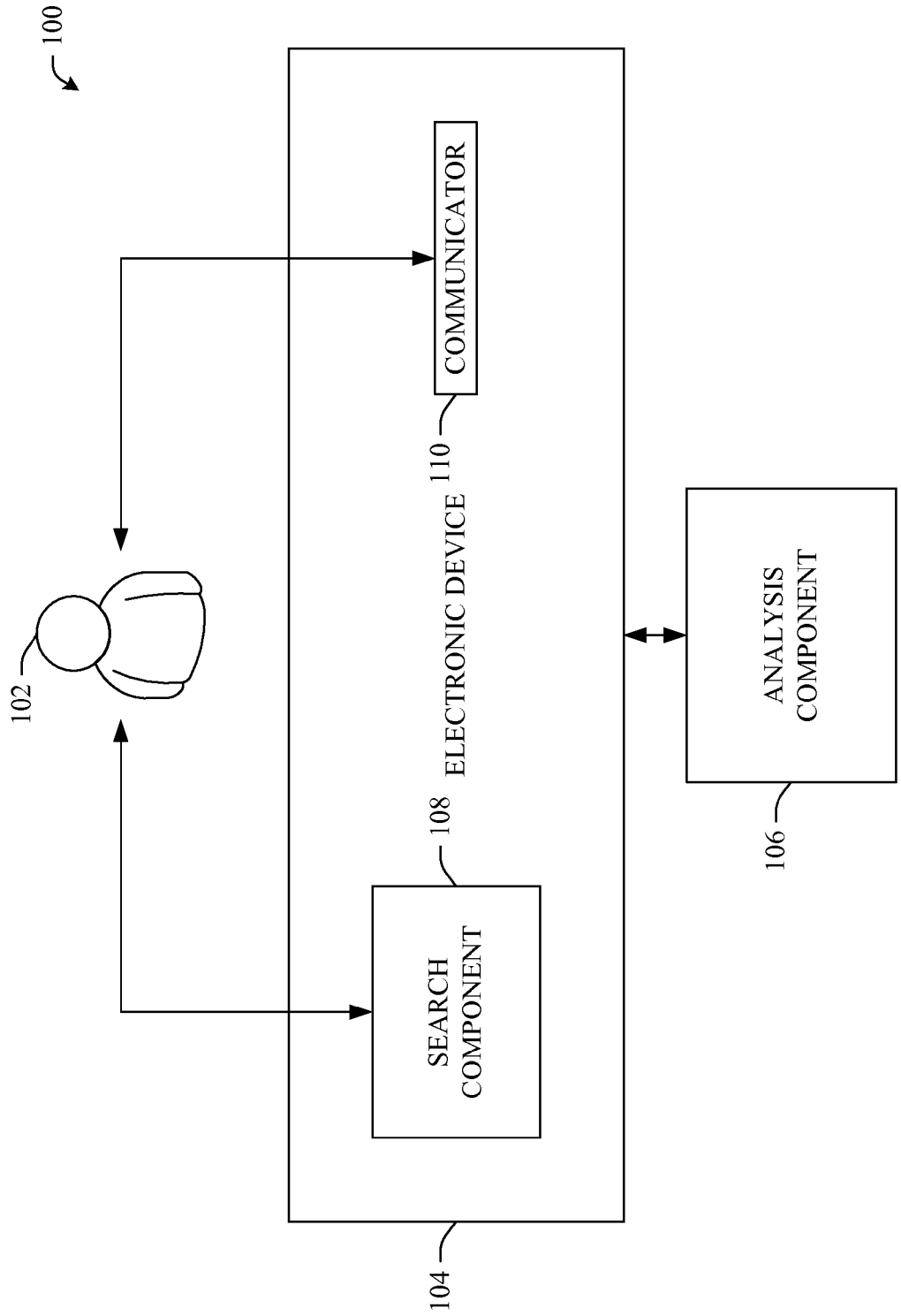
FIG. 1 illustrates a representative recommendation system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example system 100 implementing aspects of the subject specification. A user 102 can use an electronic device 104 to facilitate communication and information gathering. The electronic device 104 can configure to allow different users 102 to use features of the electronic device 104 and retain separate information relating to the different users. A common electronic device 104 can be a computer, personal digital assistant, cellular telephone, and the like. The electronic device 104 is in communication with an analysis component 106 that scrutinizes information relating to the electronic device 104, specifically though a search component 108 and a communicator 110.

The search component 108 assists a user in finding information. For example, the electronic device 104 can connect to the Internet. The electronic device 104 can engage a user and process information relating to a topic of interest to the user. For example, a user can have an interest in boxing. The search component 108 engages the user and processes a query related to boxing.

The search component 108 can send information relating to the search to the analysis component 106. Furthermore, the search component 108 can save information relating to the search and the web sites visited by the user 102. A variety of information can travel to the analysis component 106. For example, information about the search entry used (e.g., boxing and fighters and Joe Louis), the number of web sites related to the search visited by the user, as well as the amount of time the user 102 spends on each site.

The communicator 110 allows the user 102 to interact with other individuals and/or electronic devices. The communicator can send communication information from the electronic device and receive communication from other electronic devices. Furthermore, the communicator 110 can allow multiple parties to communicate in a joint communication session (e.g., a chat room).

The communicator 110 can be a plurality of different communication mediums. According to one embodiment, the communicator 110 is an instant messenger that allows the user 102 to communicate through text in real time. According to another embodiment, the communicator 110 is an electronic mail (e-mail) computer program that allows the user 102 to send messages to an account of another user. According to yet a further embodiment, the communicator 110 is a text messenger that allows the user 102 to send informal messages to users on other electronic devices.

In addition, many communicators 110 include a list of individuals that have a connection with the user. Common names for a list is a 'buddy list', 'friend list', 'contact list', 'address book', and the like. Information relating to individuals on the list can be transmitted to the analysis component 106 by the electronic device 104. Furthermore, auxiliary information relating to members on the list can travel to the analysis component 106.

For example, the communicator 110 can send periodic updates to the analysis component 106. One aspect of an update can be new members that have been added to the list. Another aspect can be the last time the user communicated with individuals. A further aspect can be the length of the communication with the individuals (e.g., the amount of time of a real-time communication, the number of correspondences a user has engaged in with a text message system, etc.)

Information relating to the search component 108 and the communicator 110 travels to the analysis component 106. The analysis component 110 makes determinations and inferences based on information gathered through the search component 108 and the communicator 110. While the analysis component 106 is depicted as being a separate entity from the electronic device 104, it is to be appreciated that the analysis component 106 can integrate with the electronic device 104.

The analysis component 106 can perform a breakdown of multiple individuals, specifically individuals on the list of the user. There can be communication between the individuals and the electronic device 106. For example, the analysis component 106 can request to breakdown information of individuals on the user's list. If permission is granted, then the analysis component gathers information on searches performed by individuals on the least.

According to one embodiment, the analysis component 106 makes at least one suggestion to a user on content that is likely to be of interest to the user. For example, the analysis component determines that several searches by a user 102 relate to boxing. The analysis component can scrutinize members that have communicated with the user through the communicator 110. The analysis component 106 can determine that a number of individuals the user 102 communicates with perform searches on mixed martial arts. Therefore, the analysis component 106 can send a communication to the user 102 through the electronic device 104 that the user should view information related to mixed martial arts because it has a high likelihood of being of interest of to the user 102.

In another example, the analysis component 106 can determine that a number of individuals the user 102 communicates with perform searches on mixed martial arts. However, the user 102 has never performed a search on a combative art (e.g., boxing, mixed martial arts, freestyle wrestling, etc.) The analysis component 106 can send a communication to the user 102 through the electronic device 104 that the user should view information related to mixed martial arts because it has a high likelihood of being of interest of to the user 102 since individuals the user 102 communicates with have it as an interest. This can take place even through the user has never performed a search relating to mixed martial arts. Thus, a suggestion can be made on content that is unrelated to previous searches of the user 102.

According to another embodiment, the analysis component 106 makes suggestions to a user on people that are likely to be of interest to the user. For example, the analysis component 106 can determine that many of the individuals the user 102 has frequently communicated with through the communicator 110 perform searches on boxing. Furthermore, these individuals communicated on their communicators with other individuals who perform searches related to boxing. The analysis component 106 can suggest individuals with a second degree of relationship or better (e.g., friend of a friend) that the user should communicate with due to a common interest. Furthermore, the analysis component 106 can suggest to the user 102 what topic the user 102 and the individual have in common (e.g., boxing).

Figure 2:
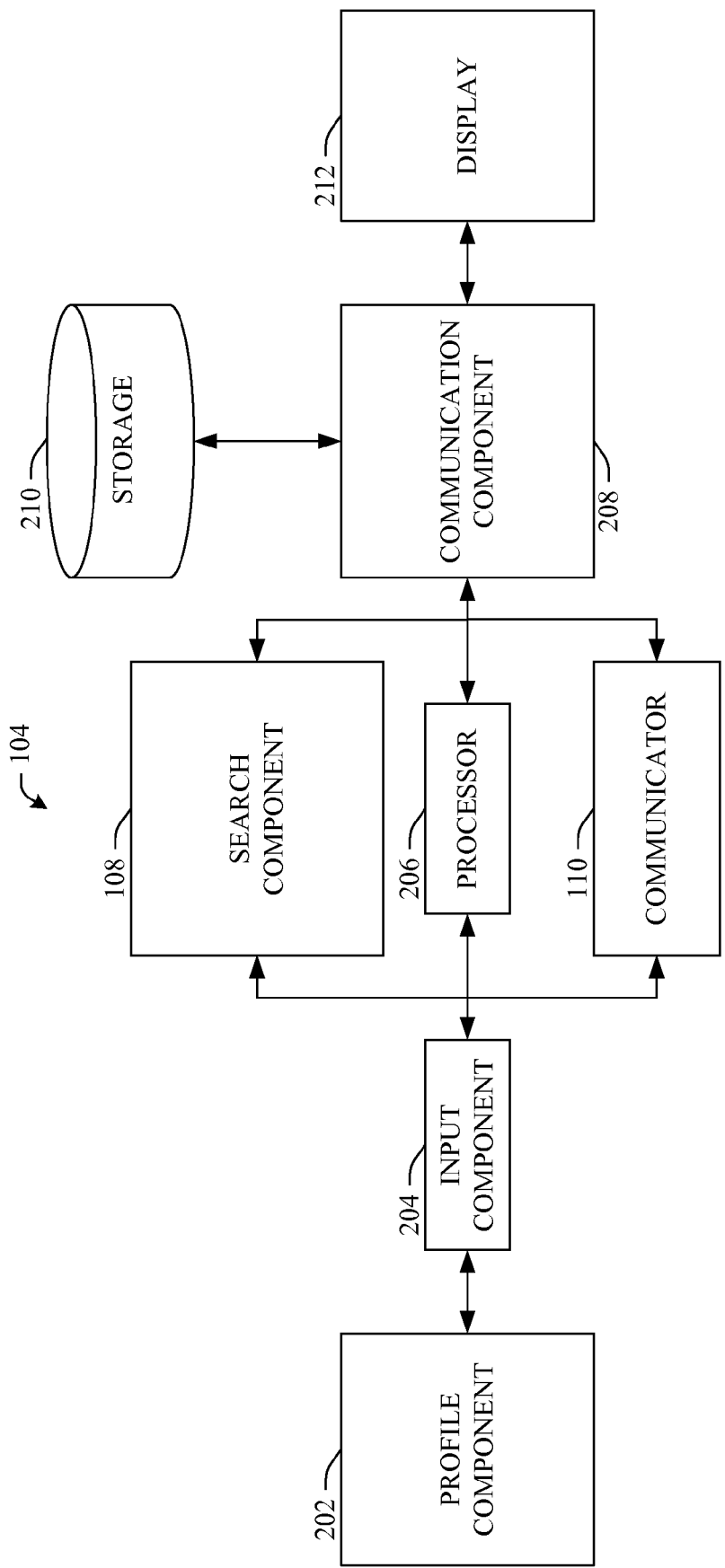
FIG. 2 illustrates a representative electronic device in accordance with an aspect of the subject specification.

FIG. 2 discloses an example electronic device 104 of FIG. 1. A profile component 202 allows different users to work on the same electronic device while keeping information separate. For example, a family of four can have different members with different interests: a middle-aged husband, a middle-aged wife, a teenage son, and a pre-teenage daughter. However, one electronic device 104 can service the different members of the family. The profile component 202 allows different users to have individual accounts that relate to the electronic device.

The users can access their individual profiles through an input component 204. Moreover, other types of communication can take place through the input component 204. This includes communication through the search component 108 (e.g., searching information through an Internet search engine) and communicator 110 (e.g., text communication during an instant message session). Commonly, this includes entering a username as well as a user specific password.

The input component 204 can be presented as a plurality of different embodiments. According to one embodiment, input component 204 is a conventional keyboard. The keyboard can integrate into the electronic device 104 or the keyboard can be an auxiliary component that connects to the electronic device 104. According to another embodiment, the input component 204 is a set of digital targets upon a screen. A user touches the targets with a stylus to places characters. According to a further embodiment, the input component 204 is a microphone. A processor 206 can convert information received by the microphone into text that can be used through the search component 108 and/or the message component 110.

The processor 206 can be a conventional central unit that coordinates operation of the electronic device 104. The processor 206 can be any of various commercially available processors. Dual microprocessors and other multi-processor architectures can also be employed as the processor 206. The processor can also perform diagnostic operations on components included in the electronic device 104.

A communication component 208 can transmit information relating to operation of the search component 108 and/or the communicator 110 to the analysis component 106 of FIG. 1. The communication component 208 can operate in conjunction with other components of the electronic device 104. For example, when a user desires to finding information through a web browser, the communication component 208 facilitates Internet communication. In another example, the electronic device 104 can be a multi-channel radio. The communication component 208 facilitates dialog with other multi-channel radios through the communicator 110.

In addition, with facilitating interaction with the analysis component 106 of FIG. 1, the communication component 208 can create a record of operation the electronic device 104. The record can include information relating to the operation of the search component 108 and/or operation of the communicator 110. The record can be placed in storage 210 included in the electronic device 104. According to one embodiment, there are periodic transmissions between the communication component 208 and the analysis component 106 of FIG. 1. In between the transmissions, the communication component 208 can create a log in the storage 210. When the time is reached to transmit to the analysis component 106 of FIG. 1, the communication component 208 reads from the log in storage 210.

A display 212 allows a user to view information that relates to the electronic device 104. According to one embodiment, the communicator 110 uses the display 212 in conjunction with the processor 206 to allow the user to interact with other individuals. According to another embodiment, the user utilizes the display in operating the search component 108. The input component 204 can integrate with the display 212. For example, if the input component 204 is a set of targets contacted with a stylus, then the display 212 can present the targets to the user.

Figure 3:
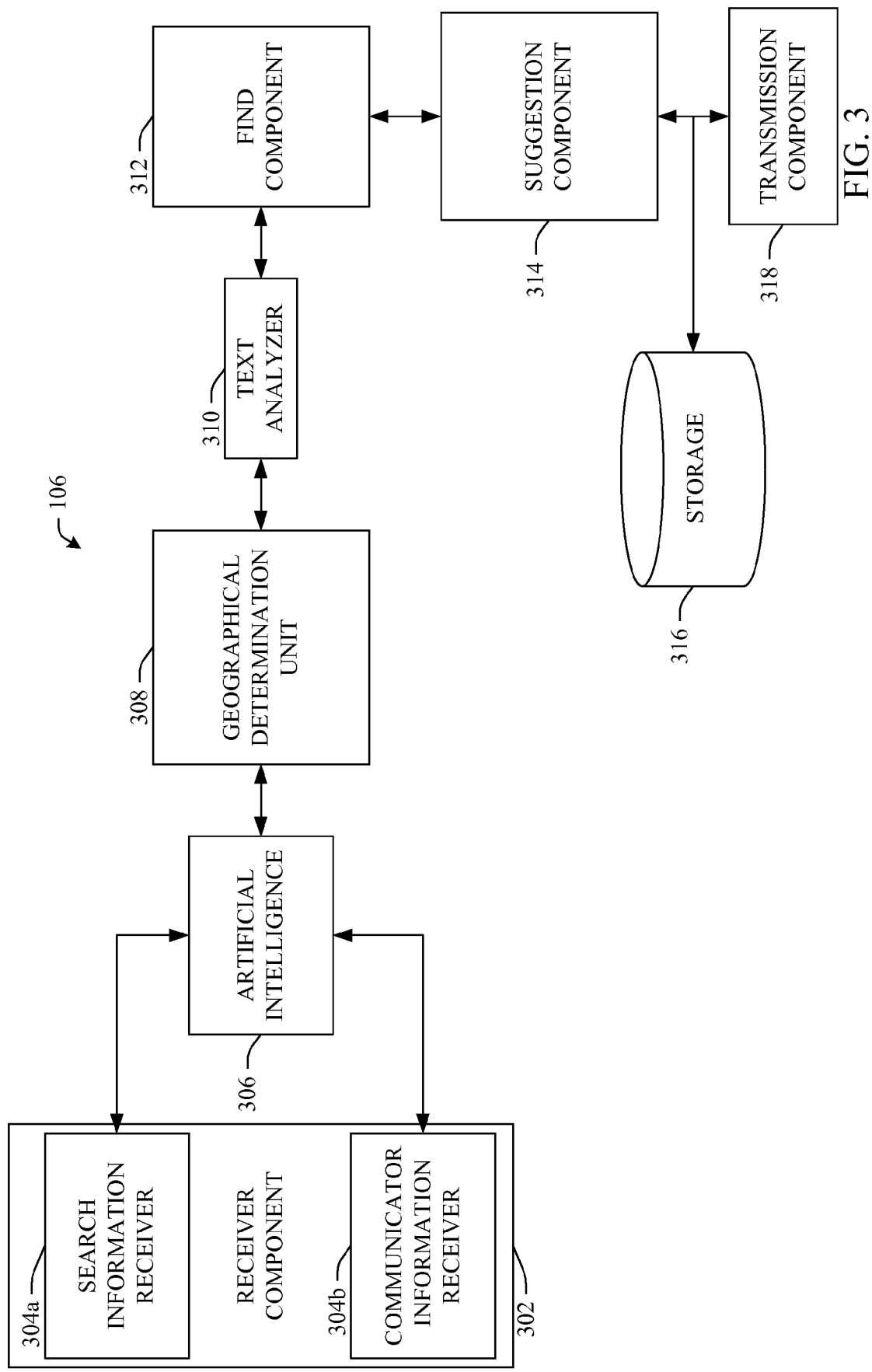
FIG. 3 illustrates a representative analysis component in accordance with an aspect of the subject specification.

FIG. 3 discloses an example analysis component 106 of FIG. 1. A receiver component 302 obtains information relating to a user's operation of the electronic device 104 of FIG. 1. The receiver component 302 can include a search information receiver 304*a* accepts information related to searches performed by a user 102 of FIG. 1 through an electronic device 104 of FIG. 1. The receiver component 302 can include the capability to distinguish between different electronic devices. The search information receiver 304*a* configures to handle a wide range of information. This includes not only information related to an actual performed search (e.g., search criteria entered into a web browser), but also supplemental information to a performed search (e.g., the time of a search.) The receiver component 302 obtains information concerning at least one communication engaged in by a user with another user.

In addition to the search information receiver 304*a*, the receiver component 302 commonly includes a communicator information receiver 304*b*. This operates in a similar manner to the search information receiver 304*a*; the communicator information receiver 304*b* gathers information relating to messages in which a user 102 of FIG. 1 engages during a communication session. Moreover, gathered information is not limited to who the user 102 of FIG. 1 was in communication with, but supplemental information to an engaged communication (e.g., a host site that held a chat session.)

Artificial Intelligence (AI) 306 makes determinations and inferences relating to searches performed by a user 102 of FIG. 1 and communication sessions in which the user 102 of FIG. 1 engages. The AI 306 can employ for example, a probabilistic-based or statistical-based approach in connection with making determinations or inferences. The inferences can be based in part upon explicit training of classifier(s) (not shown) before employing the system 100 of FIG. 1, or implicit training based at least upon a user's previous actions, commands, instructions, and the like during use of the system 100 of FIG. 1.

The AI 306 can employ one of numerous methodologies for learning from data and then drawing inferences from obtained information (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, statistical techniques (e.g., simple correlation), and other approaches that perform data fusion, etc.) in accordance with implementing various automated aspects described herein.

Methods also include methods for the capture of logical relationships such as theorem provers or more heuristic rule-based expert systems. Inferences derived from such learned or manually constructed models can be employed in techniques for determining related information, such as linear and non-linear programming, that seek to maximize some objective function. For example, suggesting other individuals a user 102 of FIG. 1 should communicate with based on a common interest, suggesting other individuals a user 102 of FIG. 1 should communicate with based on a hybrid of common friend and interest, recommendation as to information a user 102 of FIG. 1 view based on interests of members of a contact list, etc.

A geographical determination unit 308 obtains geographically relevant information in relation of content suggestion (e.g., suggestion of whom a user 102 of FIG. 1 should communicate with, suggestion of what a user 102 of FIG. 1 should view, etc.). There are numerous instances where geographical information becomes important. Gathered information can pertain to the location of the user 102 of FIG. 1, the location of web sites the user 102 of FIG. 1 visits, the locations of friends on a contact list of a user 102 of FIG. 1, as well as other information.

For example, a user 102 of FIG. 1 can perform a search through the search component 108 of FIG. 1 by entering the search term football. Different sports use the term 'football' and sport represented by the name 'football' can commonly be determined through knowledge of the geographical area. In this example, the user 102 of FIG. 1 and electronic device 104 of FIG. 1 can be located in Washington, D.C., United States. Therefore, the geographical determination unit 308 can make an inference that the user 102 of FIG. 1 has an interest in American football.

However, in this same example, a plurality of web sites can come up in the search; the web sites presented to the user 102 of FIG. 1 are of different kinds of football. The user 102 of FIG. 1 selects web sites that are hosted by companies located in Scotland. Since Association football (e.g., soccer) is a popular sport in Scotland, the geographical determination unit 308 can make an inference that the user 102 of FIG. 1 has an interest in Association football.

In another example, the same user 102 of FIG. 1 as in the previous example can communicate in a number of chat rooms hosted by web sites in Australia that relate to football. A popular football type in Australia is Australian Rules football. Therefore, the geographical determination unit 308 can make an inference that the user 102 of FIG. 1 has an interest in Australian Rules football.

In addition to obtaining geographical information, the analysis component 106 can synthesize text from communications engaged through the communicator 110 of FIG. 1. According to one embodiment, the electronic device 104 transmits the actual communication engaged through the communicator 110 (e.g., the e-mail messages transmitted). A text analyzer 310 can scan the content of the messages and make inferences based on the content.

For example, the text analyzer 310 can perform a keyword search to determine words and/or phrases that are likely of interest to a user 102 of FIG. 1. According to another embodiment, the text analyzer can use at least one trained classifier to determine a likelihood of interestingness. The text analyzer 310 can operate in conjunction with multiple components disclosed in the subject specification.

For example, there can be a conversation text received by the analysis component 306 that contains multiple references to the word 'hockey.' However, multiple games utilize the term hockey and a mere keyword search could not help narrow which hockey type in which the conversation references. The text analyzer 310 can engage in information gathered by the geographical determination component 308 to assist in the analysis. In the disclosed example, both parties of communications engaged through the communicator 110 of FIG. 1 are citizens of Canada. According to one embodiment, this information is obtained through profile information. Since ice hockey is a popular form of hockey in Canada, the text analyzer 310 can make an inference that the user 102 of FIG. 1 has an interest in ice hockey.

Information related to the searches performed by the user 102 of FIG. 1 and/or the communications engaged in by the user 102 of FIG. 1 can transfer to a find component 312. The find component 312 obtains relevant information pertaining to interests of a user 102 of FIG. 1. According to one embodiment, the find component 312 assists in discovering new topics for the user 102 of FIG. 1.

For example, a user 102 of FIG. 1 can have an interest in musicals and speak to a number of friends on a user's contact list the topic. Therefore, the find component 312 can locate individuals on the friend's contact list that share an interest in musical plays. In another example, the user 102 of FIG. 1 can perform a number of searches relating to musical plays. The find component 312 can locate individuals that are on contact lists of individuals on the user's contact list that have the same interest in musical plays.

According to another embodiment, the find component 312 suggests content to a user 102 of FIG. 1. For example, the find component 312 can receive information that the user 102 of FIG. 1 performs a number of searches pertaining to camping. The find component 312 can locate individuals on the user's contact list that enjoy camping. Once these individuals are located, there can be a determination of auxiliary interests of individuals with an interest in camping.

A suggestion component 314 makes proposals to a user 102 of FIG. 1 related to the user 102 of FIG. 1 interests. Many times, proposals are based on information obtained through the find component 312. The suggestion component 314 can contain logic that makes determinations as to relevance of information gathered through the find component 312. An example proposal is proposing other individuals for a user 102 of FIG. 1 to talk to based on common searches performed the user 102 of FIG. 1 and an individual engaged by the user 102 of FIG. 1 through the communicator 110 of FIG. 1. Another example is adding a third party with a common interest to a conversation through the communicator 110 of FIG. 1.

The suggestion component 314 recommends content the user 102 of FIG. 1 should appreciate based on at least one communication engaged in by the user. A communication engaged in by the user with another user employed by the suggestion component 314 in content recommendation can be a real-time communication (e.g., an instant message communication.) For example, the suggestion component 314 cam recommend content based on the topic of a text communication. In another example, the suggestion component 314 can recommend content based on interests of a party engaged in the communication. The suggestion component 314 also proposes a party that a user 102 of FIG. 1 should communicate with based on at least one search performed by the user.

For example, the find component 312 can determine that individuals who like musical plays generally have an interest in operas as well as drama plays. The suggestion component 314 can analyze information relating to the user 102 of FIG. 1 and determine that while many individuals the user 102 of FIG. 1 communicates with have interest in drama plays, the user 102 of FIG. 1 performs searches on various forms of music. Therefore, the suggestion component 314 can make the inference that the user's interest lies in a music aspect of the musical plays and not a story aspect. In view of the information in conjunction with searches performed by the user 102 of FIG. 1, it is more likely that the user 102 of FIG. 1 has an interest in opera (e.g., a musical art) then in a drama play. Therefore, the suggestion component 314 can make a proposal to a user 102 of FIG. 1 that the user 102 of FIG. 1 should appreciate content relating to operas (e.g., view web sites related to operas, listen to an opera performance, purchaser a ticket to see an opera, etc.)

In another example, a user 102 of FIG. 1, who is a heterosexual male, can spend a relatively large amount of time searching Internet dating websites. Furthermore, the user 102 of FIG. 1 can spend a relatively large amount of time searching for fine dining restaurants in the user's locality. The find component 312 can locate both men and woman who perform a number of searches on these two topics. However, since the user 102 of FIG. 1 likely would like to meet heterosexual females, the suggestion component 314 can filter out individuals who are not heterosexual females and propose individuals who are heterosexual females with in interest in fine dining.

In yet a further example, the suggestion component 314 can make proposals for joint communication sessions. For example, the text analyzer 310 discovers the topic of conversation of a real-time communication (e.g., nightclubs.) Furthermore, individuals in the real-time communication session are from the same geographical area (e.g., Miami.) If the user 102 of FIG. 1 has the same or a similar interest (e.g., nightclubs), then the suggestion component 314 can propose that the user 102 of FIG. 1 join the conversation, even if the user 102 of FIG. 1 have never communicated with the individuals.

This could also take place in adding strangers with a similar interest to conversations in which the user 102 of FIG. 1 engages. Third parties can be identified as having similar interests as the topics discussed in a real-time conversation. The find component 312 can locate third parties and the suggestion component 314 can make evaluations on discovered third parties and make recommendations if the third party should be invited to the conversation.

A record of suggestions can be placed in storage 316 for reference at a later time. Other units disclosed in the subject specification can utilize the storage 316. The suggestions travel to the electronic device 104 of FIG. 1 through a transmission component 318. The transmission component 318 can also receive information concerning a response to a made suggestion. For example, the suggestion component 314 can propose a search topic to a user 102 of FIG. 1. However, the user 102 of FIG. 1 could have no interest in the topic. The user 102 of FIG. 1 can transmit to the analysis component 106 his opinion of the topic and the opinion can be recorded in storage 316.

When another suggestion is to take place, the suggestion component 314 can examine contents of the storage 316 and use previous responses in making further proposals. Furthermore, the response to a proposal can be passive. For example, a user 102 of FIG. 1 does not provide a response, but the user does not perform a search on a related topic recommended by the suggestion component 314. The analysis component 106 can sense that the search was not preformed and make a record of the action in storage 316. The next time a recommendation is performed, the suggestion component 314 can utilize the record of a non-performed search in the storage 316 in determining what recommendation to make. According to one embodiment, the receiver component 302 and the transmission component 318 integrate together to form one unit.

The suggestion component 314 proposes a party a user 102 of FIG. 1 should communicate with based on at least one search performed by the user 102 of FIG. 1; the transmission component 318 sends a proposal from the suggestion component 314 to the user 102 of FIG. 1. The receiver component 302 receives information concerning at least one interpersonal communication engaged in by the user 102 of FIG. 1. The suggestion component 314 can also propose content the user should appreciate based on at least one communication engaged in by the user 102 of FIG. 1.

It is to be appreciated that disclosed drawings are single representations and aspects of the subject specification can take place through numerous configurations. For example, FIG. 3 can be arranged where various components (e.g., text analyzer 310, geographical determination component 308, find component 312, etc.) communicate directly with artificial intelligence 306. Furthermore, various components can communicate with one another in different orders as well as multiple times. For example, in FIG. 3, artificial intelligence 306 can make a first inference, refer to the geographical determination component 308, and then make a second inference based on information referred to by the geographical determination component 308.

Figure 4:
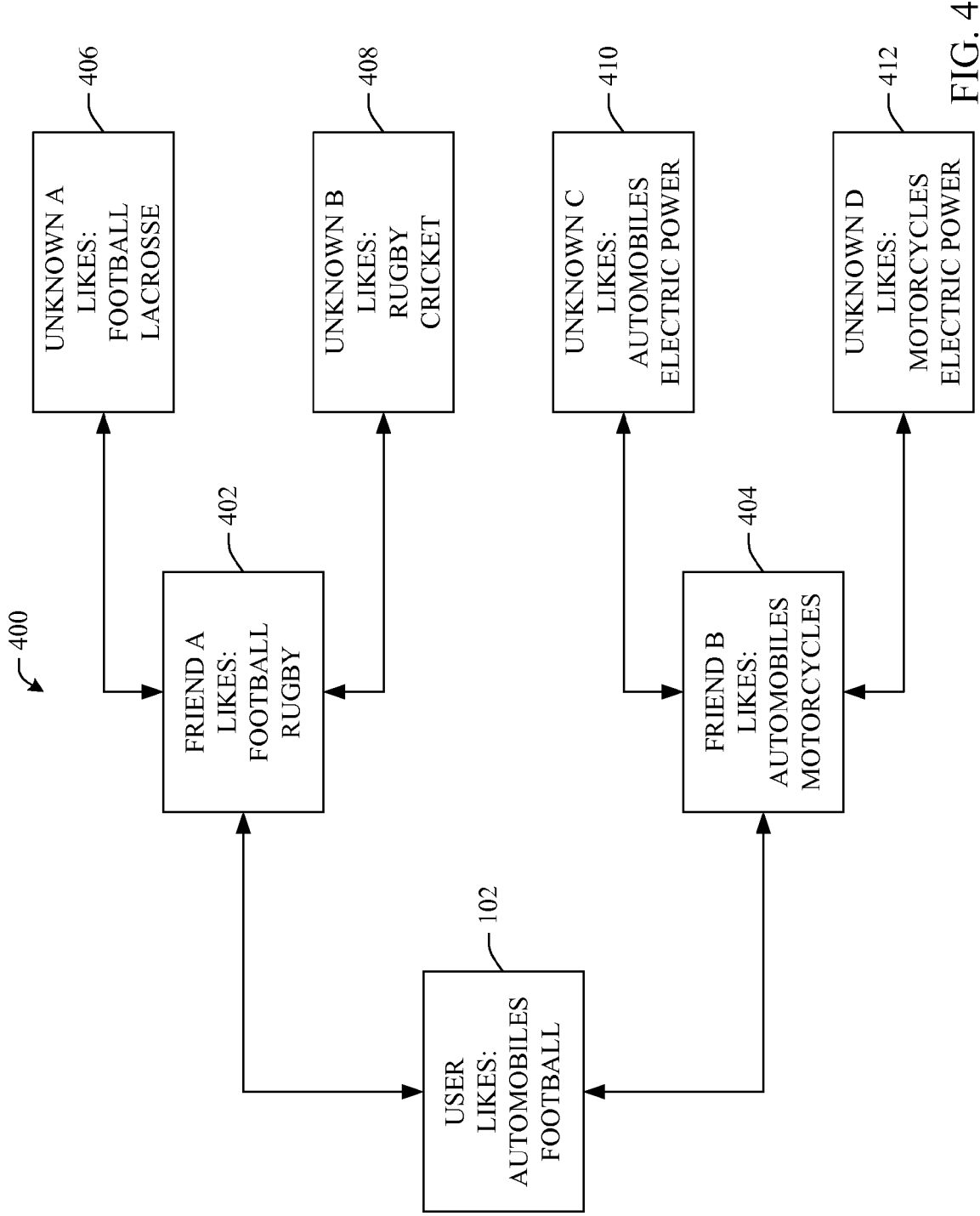
FIG. 4 illustrates a representative recommendation configuration in accordance with an aspect of the subject specification.

FIG. 4 discloses an example friend reference chain 400 as disclosed in the subject specification. The friend reference chain 400 is an example of an implementation performed by the analysis component 106 of FIG. 1. A user 102 can have two main interests, automobiles and football, in which the user 102 performs searches relating to the topics utilizing the search component 108 of FIG. 1. While FIG. 4 discloses the user 102 with two interests, it is to be appreciated the analysis component 106 of FIG. 1 and the subject specification can configure to operate in conjunction with more complex models.

The user 102 can have two friends on a contact list: 'Friend A' 402 and 'Friend B' 404. 'Friend A' can have an interest in football and rugby and football is the interest that links 'Friend A' 402 with the user 102. 'Friend A' has two other individuals on his contact list, 'Unknown A' 406 and 'Unknown B' 408, whom the user 102 does not know. 'Unknown A' 406 shares an interest with 'Friend A' 402 of football while 'Unknown B' 408 shares an interest with 'Friend A' 402 of rugby.

The analysis component 106 of FIG. 1 can operate in different manners. According to one embodiment, the analysis component determines that 'Friend A' 402 has an interest in rugby. Therefore, the user 102 could also find rugby interesting so a suggestion is made that the user 102 should look at information relating to rugby.

According to another embodiment, 'Unknown A' 406 and the user 102 share a common interest in football and a common contact in 'Friend A' 402. Therefore, a suggestion can be made that the user 102 and 'Unknown A' 406 communicate with one another. This can also include a joint communication session with the user 102, 'Friend A' 402 and 'Unknown A' 406. According to yet another embodiment, since 'Unknown A' enjoys lacrosse, it is possible that the user could have an interest in lacrosse since there is a common interest of football. However, this can be classified as a lesser likelihood since it is an interest shared with a non-contact as opposed to rugby, which is an interest shared with a contact.

According to a further embodiment, the analysis component 106 of FIG. 1 makes a determination concerning the interest of 'Unknown B' in cricket. In one configuration, since there is loose relationship between football and cricket, the analysis component 106 of FIG. 1 can determine if a suggestion should be made relating to cricket. The determination can be based on previous interactions, internal logic, etc. Furthermore, a similar determination can take place concerning communication between 'Unknown B' 408 and the user 102.

There can also be suggestions of content based on 'Friend B' 404. 'Friend B' 404 shares a common interest with the user 102 of automobiles, while 'Friend B' 404 also has an interest in motorcycles. Similar determinations can take place as took place concerning the interest of the user 102 and 'Friend A' 402 (e.g., if the user 102 should be suggested to evaluate information relating to the interest of 'Friend B' in motorcycles, etc.)

However, the relationship between the user 102 and 'Friend B' can highlight another characteristic that can be utilized by the analysis component 106 of FIG. 1. 'Unknown C' 410 and 'Unknown D' 412 both have a common interest in electric power. While this is not an interest shared by a contact of the user 102, it is an interest with multiple individuals with a second degree of relationship to the user 102. This can demonstrate a high likelihood that electric power would be of interest to the user; at least more of interest then the interest of cricket demonstrated by 'Unknown B' 408. The analysis component 106 of FIG. 1 can make determinations or inferences or both based off multiple connections.

Figure 5:
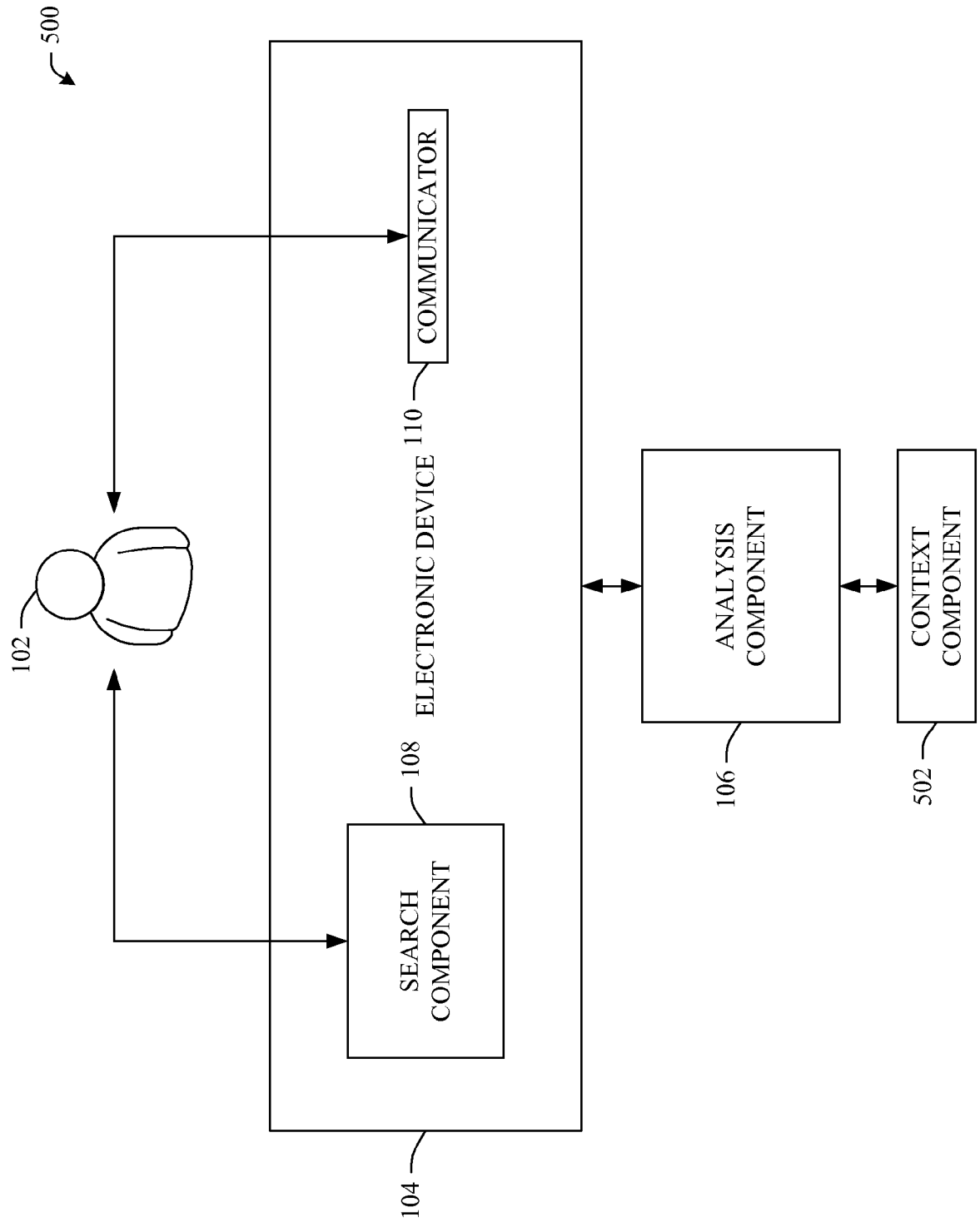
FIG. 5 illustrates a representative recommendation system with a context component in accordance with an aspect of the subject specification.

FIG. 5 discloses an example system 500 implementing aspects of the subject specification with additional utilization of a context component 502. A user 102 can engage an electronic device 104 for communication and/or information gathering. Based on the engagement, operations can be performed by an analysis component 106 to recommend content to the user 102. However, there can be instances where a user 102 intends to operate the electronic device 104, but there is confusion on what the user 102 has an interest in doing due to text entered by the user 102 to a search component 108 and/or a communicator 110. A context component 502 assists the electronic device 104 and analysis component 106 in determining the desires of the user. The context component 502 determines perspective of at least one term of at least one search performed by the user.

For example, the user can engage a search component 108 to perform a search on the Internet. Through the search component 108, the user 102 can enter the term "Saturn" into a search entry area of a search engine web browser. There are multiple means to the proper term 'Saturn' including an automotive company, a planet, and a Roman god. However, with only the entry of the term 'Saturn', conventional systems can have a difficult if not impossible time determining what the user 102 intended.

The context component 502 can work in conjunction with the analysis component 106 to determine what the user 102 intended with the term 'Saturn.' The analysis component 106 can examine past searches and communicator conversation. In one example, the user 102 can have performed a number of searches containing text Ford, Civic, Peugeot, horsepower, and after-market; these search terms relate to automobiles. The context component 502 can determine that the user 102 likely searched 'Saturn' in the goal of finding the information concerning the automobile company. Based on the determination, search results relating to the automobile company can be listed before other results on a search return.

The context component 502 can have a temporal component that allows the context component to examine information relating to the time in which searches are performed. For example, the user 102 can be a college student that has a substantial interest in automobiles. However, the user 102 can perform research for an astronomy paper. Therefore, while a substantial number of searches performed by the user 102 for 'Saturn' can pertain to automobiles recent searches pertain to astronomy. The context component 502 can identify this and return results relating to astronomy before results for automobiles since recent searches pertain to astronomy.

The context component 502 can include a differentiation component. The differentiation component allows to context component to perform different analysis based on searches and communication sessions. For example, a user 102 can engage the search component 108 for astronomy searches while the user 102 engages the communicator 110 to discuss automobiles. The user 102 can enter a search query for 'Saturn' through the search component 108. Since the user 102 commonly engages the search component 108 for astronomy information, the context component 502 can display to the user 102 astronomy results before other results.

Figure 6:
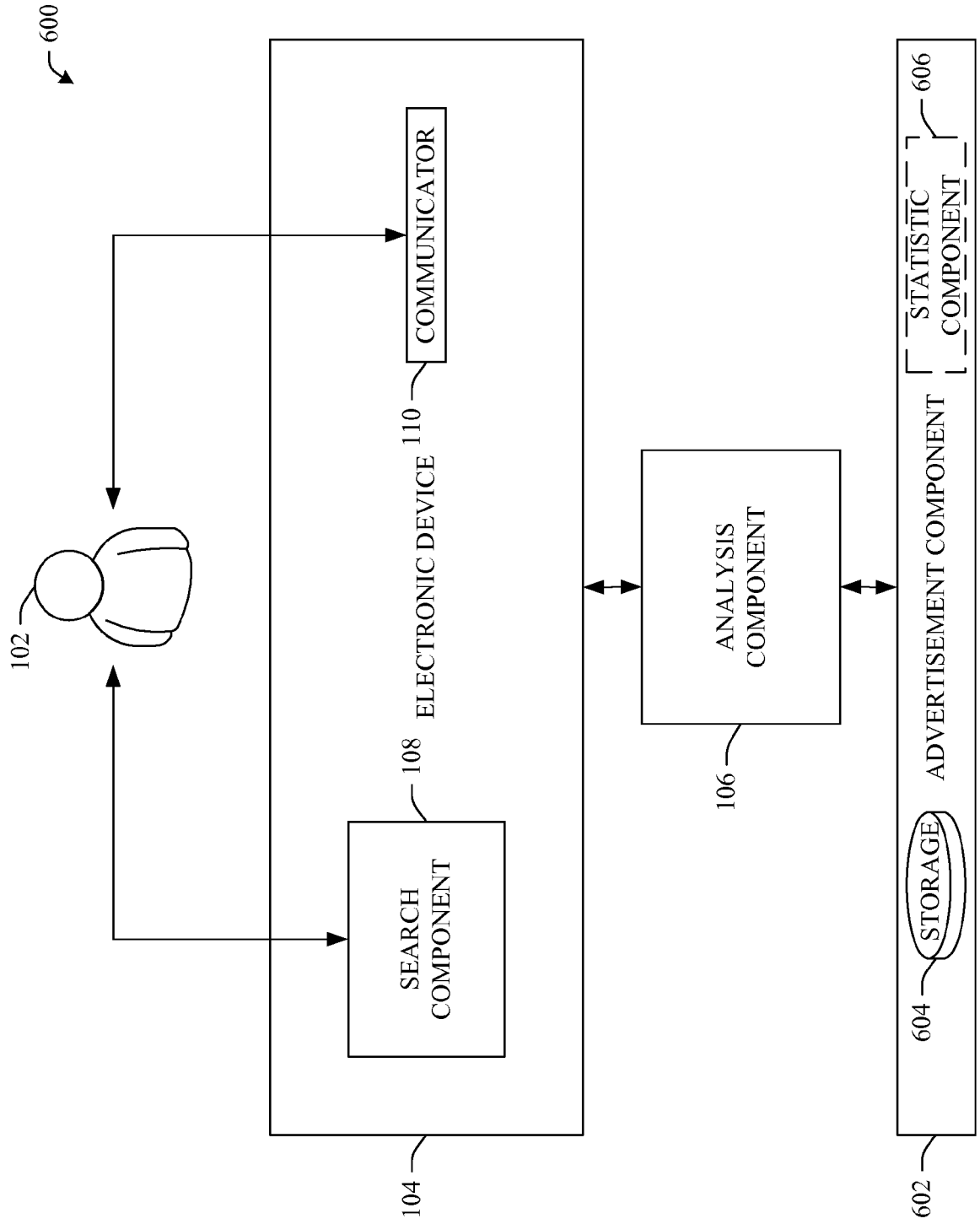
FIG. 6 illustrates a representative recommendation system with an advertisement component in accordance with an aspect of the subject specification.

FIG. 6 discloses an example system 600 implementing aspects of the subject specification with additional utilization of an advertisement component 602. A user 102 can engage an electronic device 104 for communication and/or information gathering. Based on the engagement, an analysis component 106 performs operations to recommend content and/or parties to the user 102 that relates to interests of the user 102. This can be through engagement of a search component 108 and/or a communicator 110. In addition to the suggestion of content to a user, advertisements can be directed to the user 102. An advertisement component 602 allows for placement of advertisement toward the user 102 based off interests of the user 102. The advertisement component 602 presents proposals based at least in part off at least one search performed by the user 102, based in part off a recommendation of a part to communicate with, or based off at least part of both.

There can be a benefit to subjecting the user 102 with advertisements that are directed specifically to the user's interests. An advertisement that is directed to a user interest can have a higher likelihood of being selected. This could assist in increasing the ad-click rate (e.g., ratio of number of times an advertisement is selected against the number of times it appears). According to one embodiment, the advertisement component 602 transmits a 'pop-up' promotion to the user through the display 212 of FIG. 2. The promotion can be commercial in nature (e.g., buy this product) or can be non-commercial (e.g., come to this even.)

For example, the user 102 can be a comic book aficionado who spends great lengths of time discussing comics with friends and performing searches related to comic book heroes. A number of friends (e.g., individuals on a contact list of the communicator 110) of the user 102 have discussed and searched a new comic book hero that has not been searched by the user 102. While the analysis component 106 suggest to the user 102 content concerning the new comic book hero, the advertisement component 602 can disclose a promotion of a presentation at a local store concerning the new comic book hero. Due to the user's interest in comic books, there should be a higher likelihood that the user 102 selects the promotion. The promotion could also be for a transaction; for example, an opportunity to purchaser the first issue featuring the new comic book hero.

Furthermore, the advertisement component 602 can assist in specifically targeting the user 102 based on the demographics of the user. According to one embodiment, the demographic information (e.g., age and gender) of the user 102 are not known, however, the age and gender of individuals in communication with the user 102 through the communicator 110 is known. The advertisement component 602 can make an inference based on whom the user 102 communicates with to determine demographic information for the user 102. For example, if the user 102 participates in a number of chat rooms relating to polo, country clubs, and exotic travels, then the advertisement component 602 can make an inference the user 102 is of a relatively high socioeconomic class. This can also take place for location; if a number of people the user 102 communicates with are located in a particular zip code, an inference can be made that the particular zip code is the user's zip code.

According to another embodiment, individual demographic information is not known and the advertisement component makes inferences based on searches performed by the user 102. For example, there is no information known to the advertisement component relating to the age and/or gender of the user 102 or individuals in communication with the user 102. However, general information relating to searches is known by the advertisement component.

In this example, the user 102 can perform a number of searches through the search component 108 regarding college and university admission as well as searches regarding high school prom dresses. The advertisement component 602 can make an inference that the user 102 is a teenage girl based on the performed searches. Therefore, the advertisement component 602 can direct advertisement to the user that is based on the demographic of a teenage girl. It is possible that the inference be incorrect; for example instead of the user 102 being a high school girl, the user 102 could be a parent of a teenage girl.

The advertisement component 602 can communicate with a database to retrieve information relating to the promotions. For example, the advertisement component 602 can transmit to the database characteristic information concerning the user and the database can instruct the advertisement component 602 to present a specific promotion. The promotion can be located in storage 604 of the advertisement component 602 or can be received from the database. Furthermore, the advertisement component 602 can employ a statistic component 606 to measure various aspects of the promotion. For example, the statistic component 606 can measure the response of the user 102 to the promotion and perform calculations upon the measurement. The statistic component 606 can perform both probability-based operations as well as data manipulation operations (e.g., non-probability.)

Figure 7:
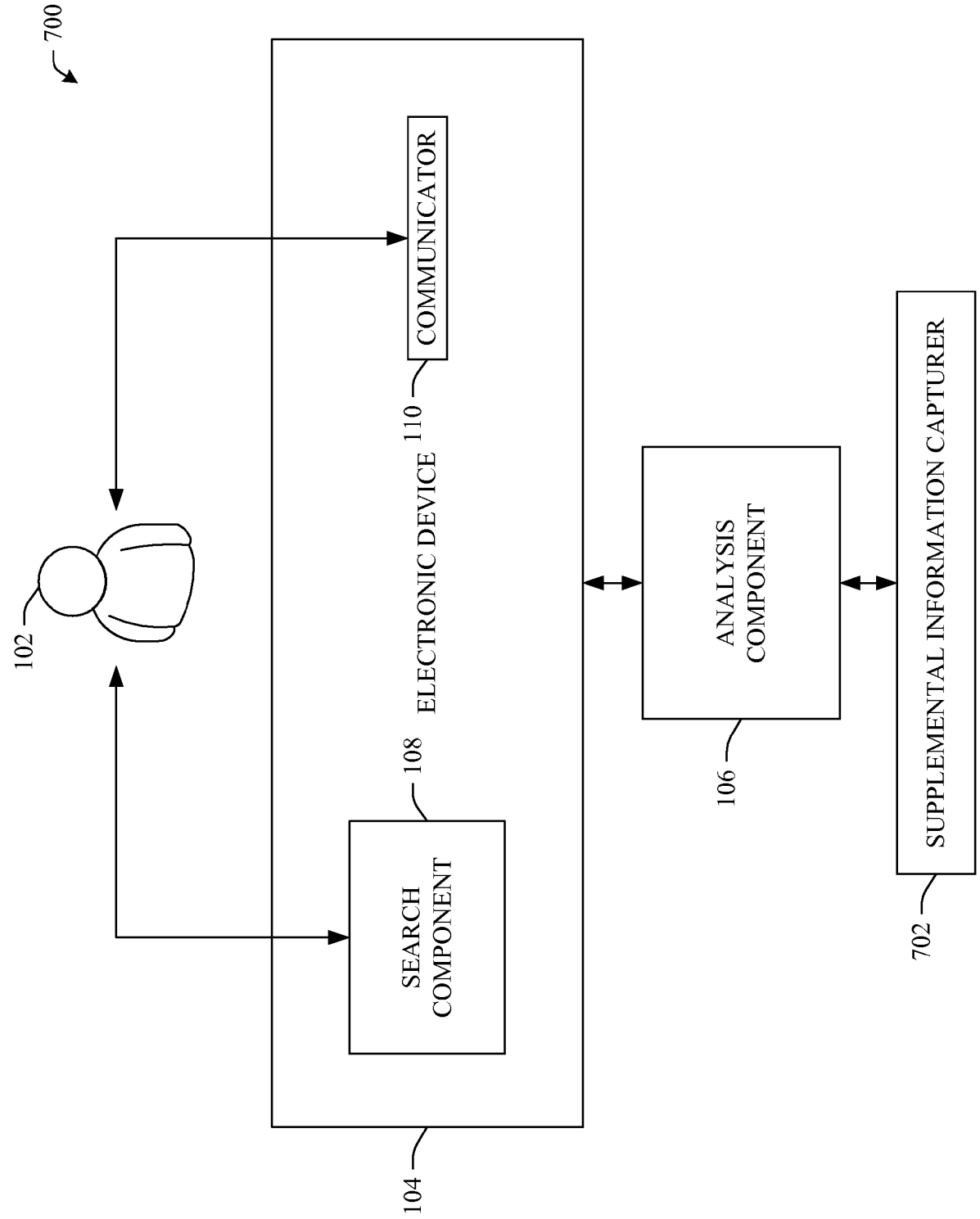
FIG. 7 illustrates a representative recommendation system with a supplemental information capturer in accordance with an aspect of the subject specification.

FIG. 7 discloses an example system 700 implementing aspects of the subject specification with additional utilization of a supplemental information capturer 702. A user 102 can engage an electronic device 104 for communication and/or information gathering. Engagement can take place through a number of embodiments, including through a search component 108 and a communicator 110. Based on the engagement, operations can be performed by an analysis component 106 to recommend content to the user 102.

The supplemental information capturer 702 can obtain characteristic information in relation to the user 102. For example, the supplemental information capturer 702 can obtain information relating to age, gender, sexual orientation, location, etc. This can take place through a number of different embodiments. According to one embodiment, the supplemental information capturer 702 gathers characteristic information from the profile component 202 of FIG. 2. According to another embodiment, the supplemental information capturer 702 can make a specific request to the user 102 to provide specific information.

Though disclosed in different drawings, it is to be appreciated that various components can operate together and utilize resources of one another. For example, the supplemental information capturer 702 can work in conjunction with the advertisement component 602 of FIG. 6 to provide promotions directed to the user 102. The supplemental information capturer 702 can provide characteristic information to the advertisement component 602 of FIG. 6. The advertisement component 602 of FIG. 6 can utilize the characteristic information in providing an advertisement to the user 102.

Figure 8:
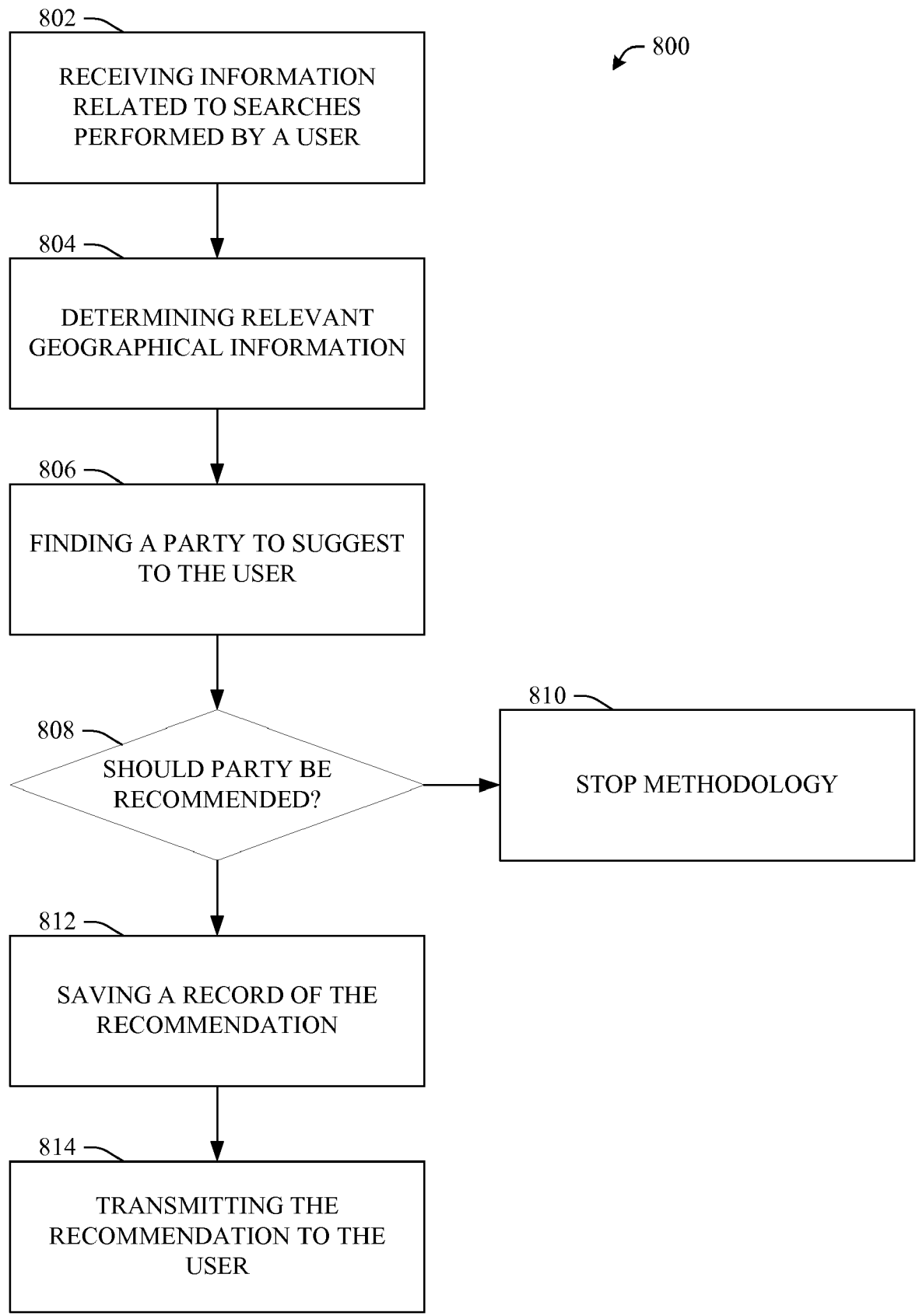
FIG. 8 illustrates a representative party recommendation methodology in accordance with an aspect of the subject specification.

FIG. 8 discloses an example methodology 800 for recommending a party to a user based on searches performed by the user. There is reception of information related to searches performed by a user 802. For example, a user performs an Internet search and the query travels though an analysis component that holds a copy of the query.

There is a determination of relevant geographical information 804. This can include the location of the user as well as the location of web pages that a user views. For example, the user can view a number of web pages that relate to Japanese automakers. Therefore, it can be determined that the user has an interest in Japan-related information.

The methodology continues to finding a party to suggest to the user 806. The party to suggest to the user is found through analysis of received search information. Continuing the previous example, parties can be found that share an interest of Japanese automakers. Since the user performs searches on topic of Japanese automakers, there is a relatively high likelihood that the user will desire to engage in a communication related to Japanese automakers.

A check takes place to determine if a party should be recommended 808. Parties can include both people, animals (e.g., a user has an interest in hunting and the user can be recommended to communicate with a hunting dog), automated processes (e.g., a user has an interest in joining the military and the user can be recommended to communicate with an automated question and answer program), and the like. If a party should not be recommended, the methodology 800 is stopped 810. This can include sending a notice to a user that no party could be found.

Various logic types can be employed by the check. For example, the check can determine a probability the user will find the party interesting. If the probability is not of a specific threshold, then the recommendation is not made. Furthermore, if the user has a history of not accepting recommendations, then the threshold can be moved and check requirements can become stricter.

If the recommendation should take place, the methodology 800 continues. There can be a saving of a record of the recommendation 812. This can include saving a file in local storage or transmitting the file to a database storage location. Action 814 allows for transmitting the recommendation to the user 814. Action 814 can operate in conjunction with act 812 that in one common transmission, information travels to both the user and the database.

Figure 9:
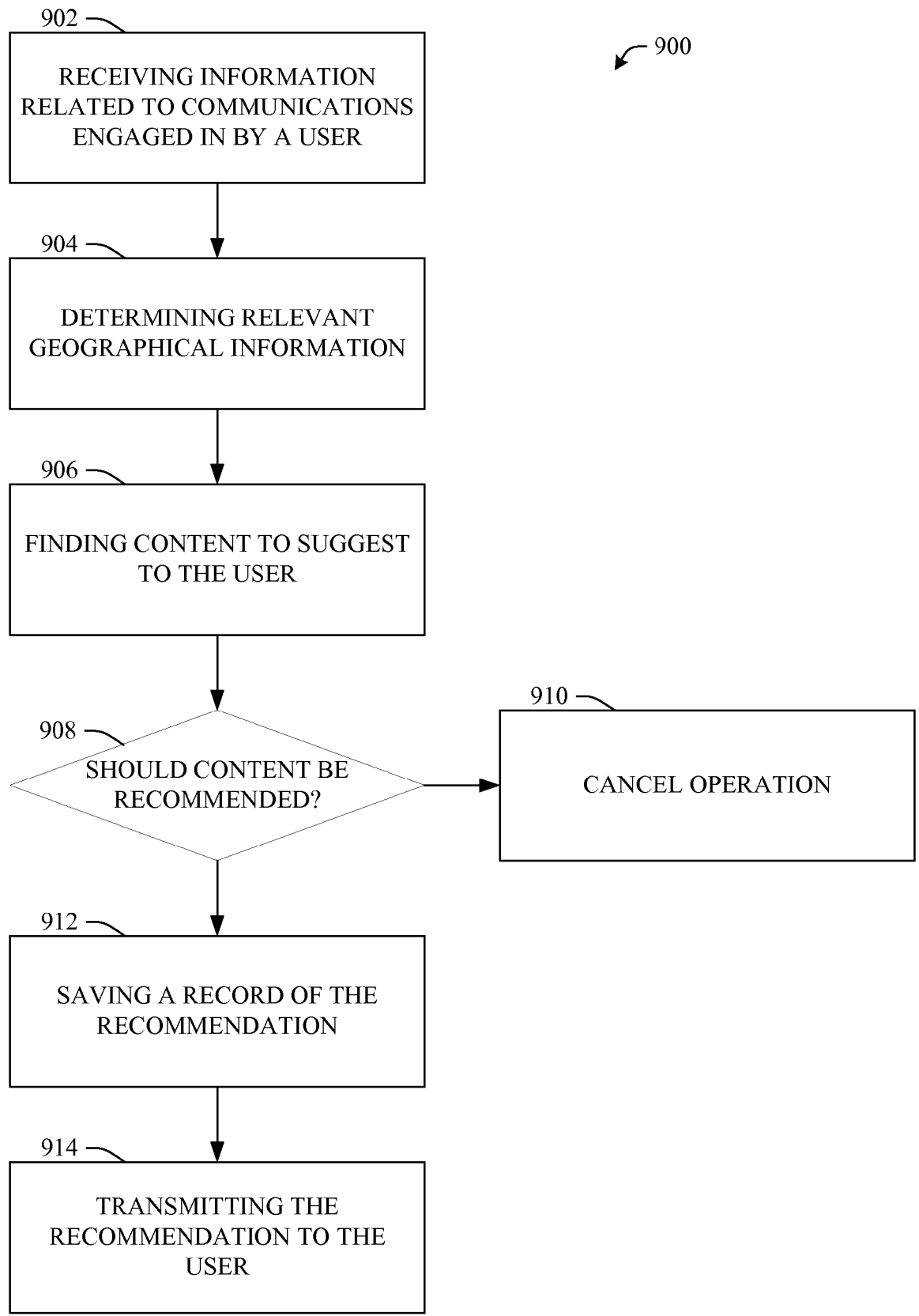
FIG. 9 illustrates a representative content recommendation methodology in accordance with an aspect of the subject specification.

FIG. 9 discloses an example methodology 900 for recommending content to a user based on communicated engaged in by the user. There is reception of information related to communications engaged in by a user 902. For example, an analysis component can monitor a real-time communication (e.g., instant message session) engaged in by a user. In another example, there can be reception of a bulk of communications received during a specified amount of time.

There is a determination of relevant geographical information 904. For example, the user can communicate with a number of individuals in Fiji while the user resides in the United States. It can be determined that the user has an interest in material that relates to Fiji.

The methodology continues to finding content to suggest to the user 906. This can be based on communications entered into by the user. For example, the communications can focus on the topic of sailing. Therefore, an inference can be made that the user could find other types of boating interesting. There can be locating of content of other types of boating (e.g., kayaking.)

A check takes place to determine if content should be recommended 908. The action 908 can use multiple factors in determining if content should be presented to the user. For example, if content is found pertaining to an event that has already taken place, then it is unlikely the information will be of interest to the user. If content should not be recommended, the methodology 900 is stopped 910.

Various logic types can be employed by the check. For example, the check can determine a probability the user will find the content interesting. If the probability is not of a specific threshold, then the recommendation is not made. Furthermore, if the user has a history of not accepting recommendations, then the threshold can be moved and check requirements can become stricter.

If the recommendation should take place, the methodology 900 continues. There can be a saving of a record of the recommendation 912. This can include saving a file in local storage or transmitting the file to a database storage location. Action 914 allows for transmitting the recommendation to the user 914. Action 914 can operate in conjunction with act 912 that in one common transmission, information travels to both the user and the database.

Figure 10:
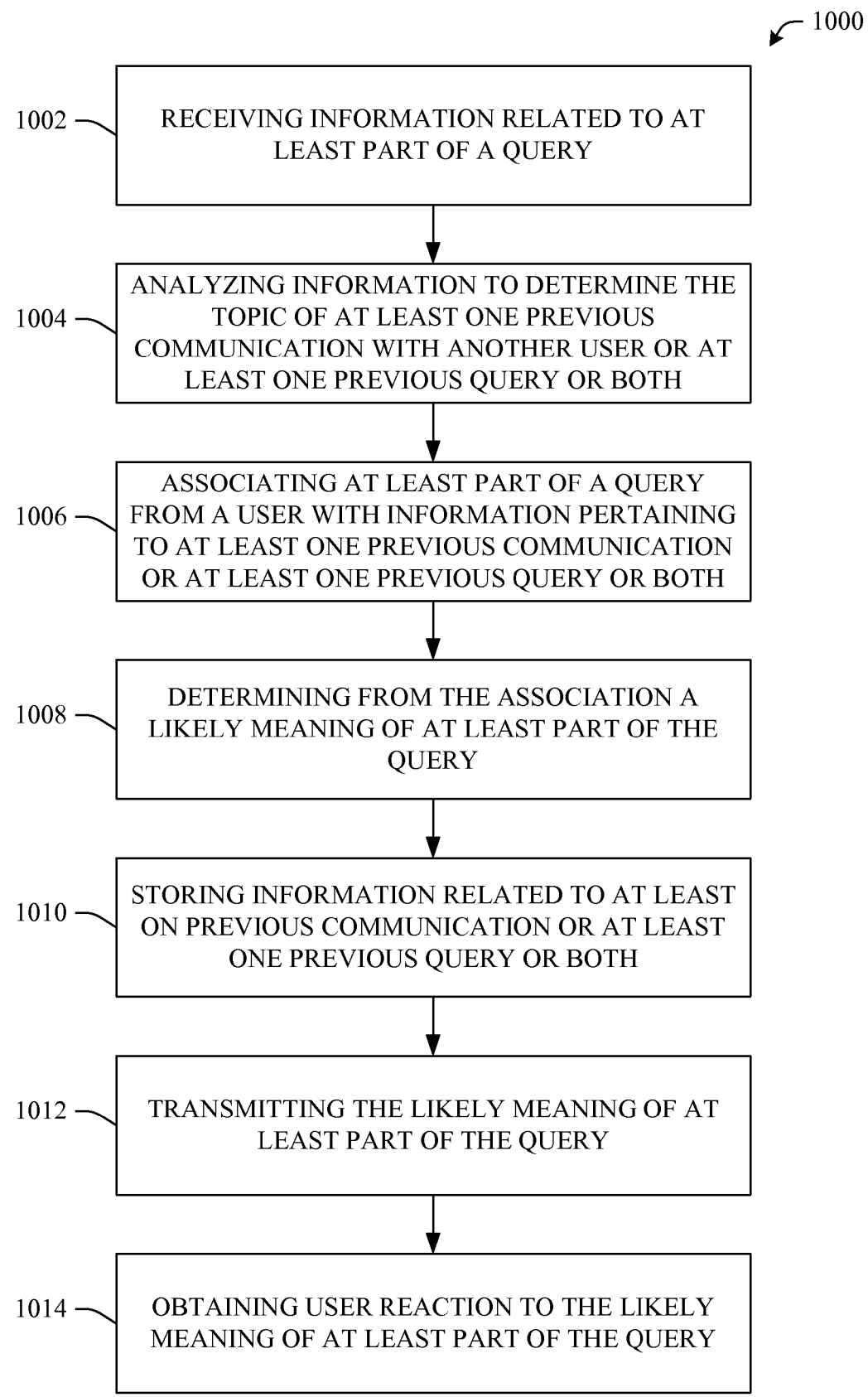
FIG. 10 illustrates a representative context recommendation methodology in accordance with an aspect of the subject specification.

FIG. 10 discloses an example methodology 1000 for disambiguating searches performed by a user. Often times, a user runs a search that contains a term that is ambiguous. The methodology 1000 attempts to find a likely means for the term and transmit the likely meaning to an appropriate component.

Receiving information related to at least part of a query 1002. A user can perform a search query trying to find information. For example, the user could run a search on the word 'Ruby.' Ruby has multiple meanings depending on the context; ruby can refer to a type of jewel and ruby can refer to a programming language. While context clues can be used (e.g., capital 'R' could mean the programming language, while lower case 'r' could mean the jewel), many searches are run informally and this distinction could be of little use in deciphering the intended meaning of the term 'ruby.'

There can be analyzing of information to determine the topic of at least one previous communication with another user or at least one previous query or both 1004. Analysis of information can assist in determining a likely meaning. According to one embodiment, a previous search is used to assist in finding a likely meaning of a term. For example, if a user has made a search for 'C++', 'Java', and 'HTML', then there can be an inference drawn that 'ruby' refers to a programming language. According to another embodiment, a previous communication is used in deciphering a likely meaning for a term. For example, if the user discusses with someone thorough an instant messenger about the difference between a sapphire and a diamond, then an inference can be drawn that 'ruby' refers to the jewel.

In addition, there can be associating of at least part of a query from a user with information pertaining to at least one previous communication or at least one previous query or both 1006. The action 1006 intertwines action 1002 and event 1004. For example, once analysis 1004 is complete, there can be three relevant searches identified by the analysis 1004 relating to the three computer languages. An association can place a logical connection between the search term 'ruby' and the three relevant instances.

There can be a determining from the association of a likely meaning of at least part of the query 1008. While there can be an association between previous searches and/or communication, the strength of the associations can very. For example, a search for the term 'C++' can be a strong association that suggests 'ruby' refers to the programming language since both are names of programming languages. However, a search for the term 'programming' can be a weak association since 'programming' could be used in other applications such as programming a video cassette recorder (VCR).

Different associations can be evaluated and compared to determine a likely meaning. For example, one previous search could involve the term 'C++' and another could involve the term 'ring'. The 'C++' association can be considered strong because it names a language, while the 'ring' association can be considered weak since there is not specific reference to a jewel or if the term 'ring' refers to an piece of jewelry worn on a finger. Therefore, a determination can be made the programming language is a likely meaning since it has a strong association over a weak association.

Furthermore, the determination can evaluate other characteristics. For example, there can be ten previous searches each relating to the programming language and the jewelry. However, temporally recent searches have focused on various programming languages. Therefore, a determination can be made that the likely meaning of the term 'ruby' is for the programming language.

Storing information related to at least one previous communication or at least one previous query or both 1010 can take place. For example, a determination that the term 'ruby' refers to a programming language can be saved in a storage component. This determination can be applied to another time the user performs a search for the term 'ruby.' This can save processing speed and system resources on a system that performs the methodology 1000.

Furthermore, there can be transmitting of the likely meaning of at least part of the query 1012. This can take place through a number of different embodiments. According to one embodiment, the likely meaning is transmitted directly to the user. For example, a question can be asked of the user 'Did you mean ruby as a programming language?' The user can respond accordingly. According to another embodiment, the likely meaning is transmitted to a search engine. The search engine ranks the order of results based on the likely meaning of the ambiguous term.

There can also be obtaining of a user reaction to the likely meaning of at least part of the query 1014. It is possible that the determined likely meaning is incorrect. For example, while many searches took place using the programming language, in an instance applying the methodology 1000 a user wanted to find a ring for their significant other. The user can communicate to a device operating the methodology 1000 that the likely meaning provided was incorrect. The methodology can configure to adapt to the user response and change for future operations.

While the disclosed methodology 1000 discusses terms concerning searches, it is to be appreciated there are other applications of the disclosed methodology 1000. For example, an analysis component 106 of FIG. 1 can analyze a communication containing the term 'Mustang.' According to two meanings, this could be a wild horse of an automobile manufactured by an automobile company. Actions in the methodology 1000 can be used to disambiguate the term to find a likely meaning.

Figure 11:
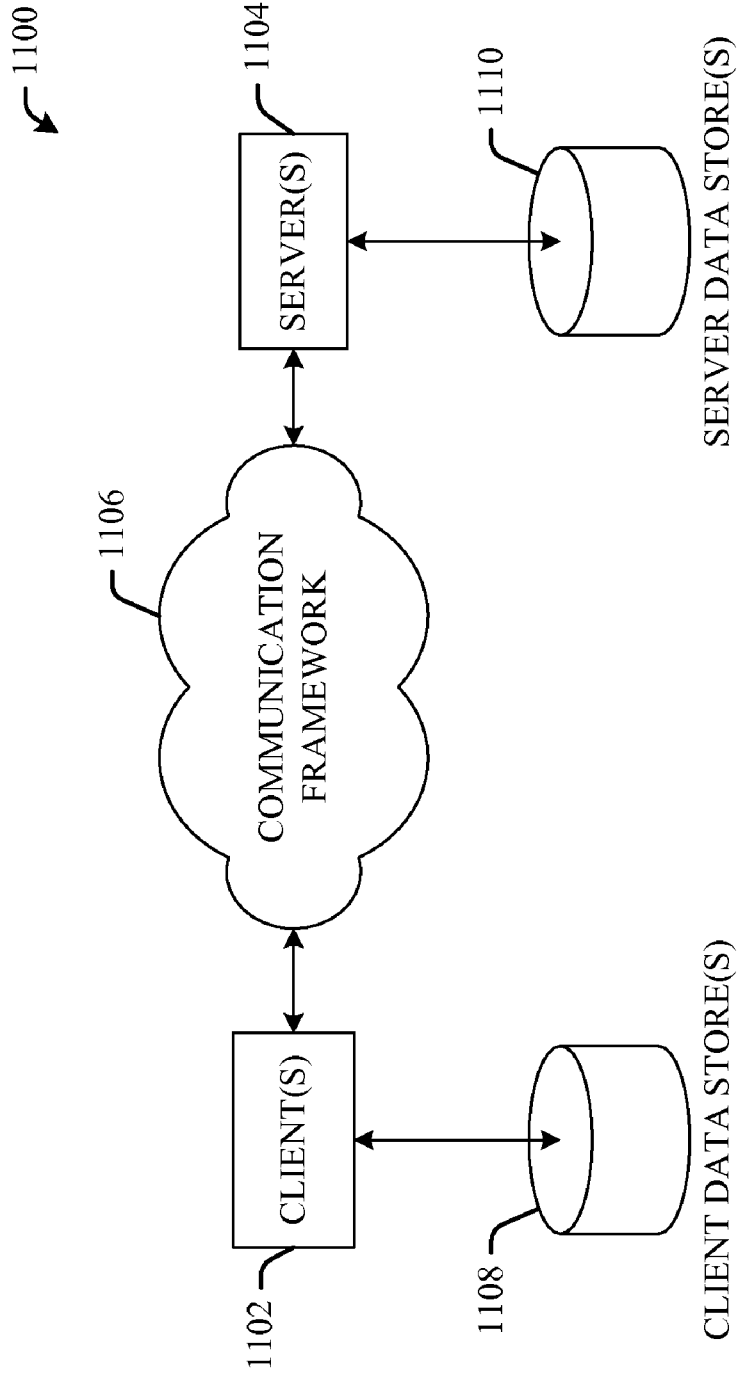
FIG. 11 illustrates an example of a schematic block diagram of a computing environment in accordance with the subject specification.

Referring now to FIG. 11, there is illustrated a schematic block diagram of a computing environment 1100 in accordance with the subject specification. The system 1100 includes one or more client(s) 1102. The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

Figure 12:
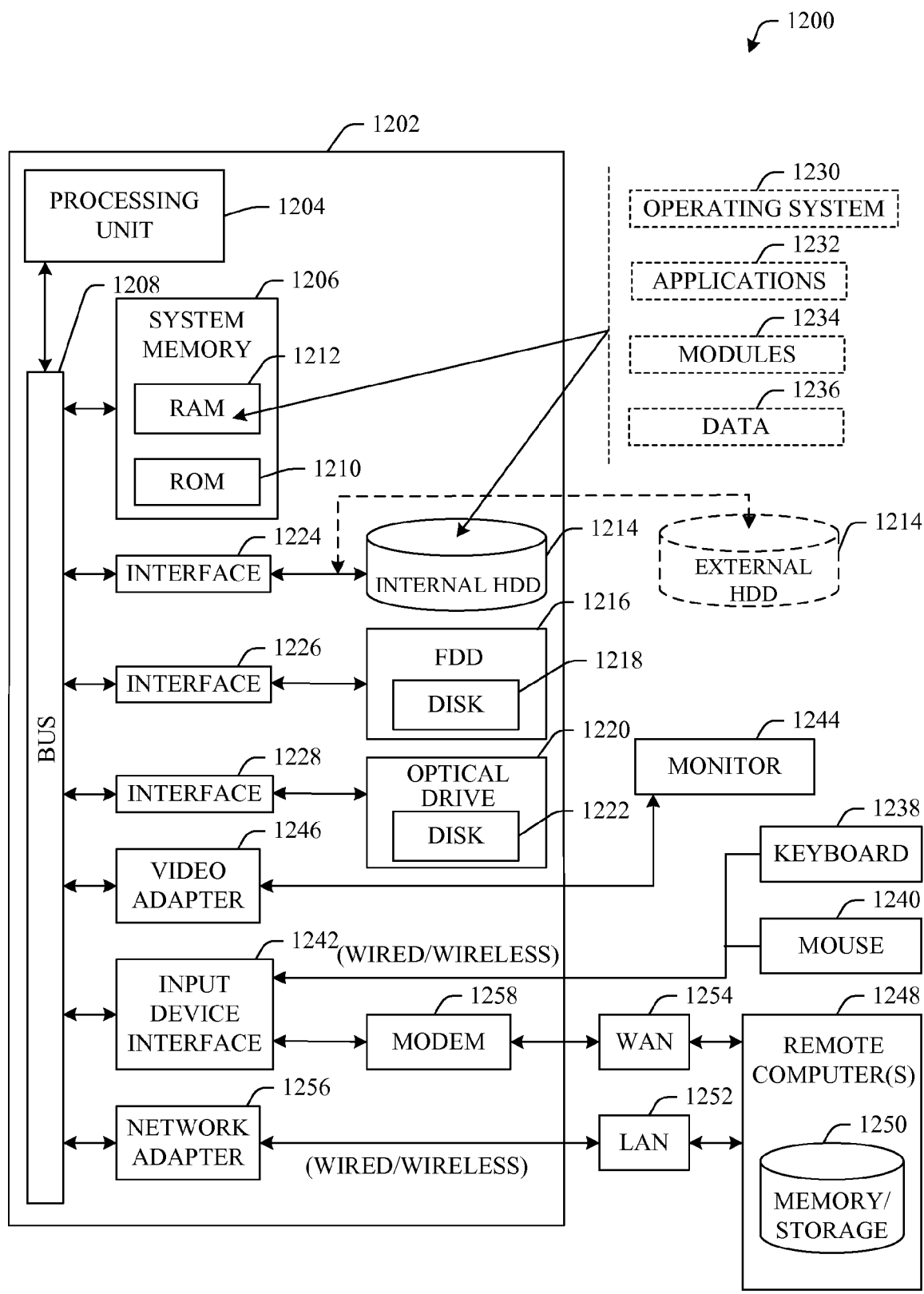
FIG. 12 illustrates an example of a block diagram of a computer operable to execute the disclosed architecture.

Referring now to FIG. 12, there is illustrated a block diagram of a computer operable to execute the disclosed architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for proposing content to a user of an electronic device, comprising:
   a processor;
   a receiver component executable by the processor to obtain information from the electronic device concerning at least one communication session engaged in by the user of the electronic device with an additional user of an additional electronic device; and
   a suggestion component executable by the processor to:
      determine a probability that the content is related to an interest of the user of the electronic device;
      determine whether to recommend the content to the user of the electronic device by comparing the probability that the content is related to the interest of the user to a threshold, wherein the threshold becomes higher when the user of the electronic device has a history of not accepting recommendations from the suggestion component; and
      when the probability that the content is related to the interest of the user is greater than the threshold, recommend the content to the user of the electronic device based on words, phrases, or a combination thereof, included in the at least one communication session engaged in by the user of the electronic device with the additional user of the additional electronic device, based on interests of the additional user of the additional electronic device, and based on a record of recommended searches that were not performed by the user of the electronic device.

2. The system of claim 1, wherein the suggestion component predicts relevance of one or more topics of the at least one communication session based on searches performed by the user of the electronic device.

3. The system of claim 1, further comprising a geographical determination component that is executable by the processor to obtain geographical characteristics of at least some of the information obtained by the receiver component.

4. The system of claim 1, wherein the at least one communication session includes an instant messaging session between the user of the electronic device and the additional user of the additional electronic device.

5. The system of claim 1, further comprising a supplemental information capturer that is executable by the processor to gather personal information of the user of the electronic device.

6. The system of claim 1, further comprising a storage component that holds one or more records that relate to the content recommended to the user of the electronic device.

7. The system of claim 1, further comprising a text analyzer that is executable by the processor to scan content of one or more messages of the at least one communication session engaged in between the user of the electronic device and the additional user of the additional electronic device and to perform a keyword search of the content of the one or more messages.

8. The system of claim 1, further comprising an advertisement component executable by the processor to provide promotion information to the electronic device, wherein the promotion information is related to the content recommended to the user of the electronic device, one or more searches performed by the user of the electronic device, or both.

9. The system of claim 1, wherein the at least one communication session engaged in by the user of the electronic device and the additional user of the additional electronic device includes at least one e-mail message.

10. The system of claim 1, wherein the suggestion component is executable by the processor to recommend a party for the user of the electronic device to contact based on at least one search performed by the user of the electronic device and based on at least one search performed by the party, wherein the at least one search performed by the user and the at least one search performed by the party are related to a particular topic.

11. A method, comprising:
    receiving, by a computer including a processor executing a context component, text of a search query from an electronic device;
    associating, by the computer, at least one word of the search query with information pertaining to at least one previous communication session between a user of the electronic device and an additional user of an additional electronic device;
    determining, by the computer, one or more contexts of the at least one word of the search query by examining past searches of the user and recent communication sessions of the user;
    determining, by the computer, a particular meaning of the at least one word from among a plurality of respective meanings of the at least one word based on the one or more contexts of the at least one word and based on the association between the at least one word of the search query and the information pertaining to the at least one previous communication session between the user of the electronic device and the additional user of the additional electronic device;
    providing, by the computer, the particular meaning of the at least one word to the electronic device;
    receiving, by the computer, an indication from the user of the electronic device whether the particular meaning of the at least one word is correct;
    ranking, by the computer, results of the search query based on the one or more contexts of the at least one word of the search query and based on the indication from the user of the electronic device whether the particular meaning of the word is correct;
    providing, by the computer, the results of the search query to the electronic device in accordance with the ranking of the results; and
    receiving, by the computer, a recommendation indicating a party for the user of the electronic device to contact based on at least the search query and based on at least one search performed by the party, wherein the search query and the at least one search performed by the party are related to a particular topic.

12. The method of claim 11, further comprising receiving, by the computer, a response from the electronic device indicating that the particular meaning of the at least one word is incorrect.

13. A method comprising:
determining, by a computer including a processor executing an analysis component, a probability that content relates to at least one interest of a user of an electronic device;
determining, by the computer, whether to recommend the content to the user of the electronic device by comparing the probability that the user of the electronic device will find the content relates to the at least one interest of the user to a threshold;
providing, by the computer, a recommendation of the content to the user of the electronic device when the probability that the content relates to the at least one interest of the user is greater than the threshold, the recommendation is based on words, phrases, or a combination thereof, included in at least one communication session engaged in by the user of the electronic device with an additional user of an additional electronic device;
associating, by the computer, at least one word of a search query with information pertaining to the at least one communication session between the user of the electronic device and the additional user of the additional electronic device;
determining, by the computer, one or more contexts of the at least one word of the search query by examining past searches of the user of the electronic device and recent communication sessions of the user of the electronic device;
determining, by the computer, a particular meaning of the at least one word from among a plurality of meanings of the at least one word based on the one or more contexts of the at least one word and based on the association between the at least one word of the search query and the information pertaining to the at least one communication session between the user of the electronic device and the additional user of the additional electronic device;
providing, by the computer, the particular meaning of the at least one word to the user of the electronic device;
receiving, by the computer, an indication from the user of the electronic device whether the particular meaning of the at least one word is correct; and
determining, by the computer, a party for the user of the electronic device to contact based on at least one search performed by the user of the electronic device and based on at least one search performed by the party, the at least one search performed by the user of the electronic device and the at least one search performed by the party are related to a particular topic.

14. The method of claim 13, further comprising:
transmitting to the electronic device a recommendation for the user of the electronic device to contact the party.

15. The method of claim 14, further comprising determining a topic discussed during the at least one communication session between the user of the electronic device and the additional user of the additional electronic device.

16. The method of claim 15, further comprising providing a recommendation to the electronic device to invite a third party to join the communication session between the user of the electronic device and the additional user of the additional electronic device.

17. The method of claim 14, further comprising sending a proposal to the electronic device recommending that the user of the electronic device join a real-time communication session between particular individuals.

18. The method of claim 17, wherein the proposal is based on a topic of the real-time communication session and based on searches performed by the user of the electronic device.

* * * * *